(12) United States Patent
Brailsford et al.

(10) Patent No.: US 7,493,732 B2
(45) Date of Patent: Feb. 24, 2009

(54) LITHO-MOSAIC

(75) Inventors: Robin Brailsford, Dulzura, CA (US);
Lee A. Shaw, Newport Beach, CA (US);
Ronald D. Shaw, Corona Del Mar, CA (US)

(73) Assignee: Lithocrete, Inc., Costa Mesa, CA (US)

( * ) Notice: Subject to any disclaimer, the term of this patent is extended or adjusted under 35 U.S.C. 154(b) by 172 days.

(21) Appl. No.: 11/585,725

(22) Filed: Oct. 24, 2006

(65) Prior Publication Data

US 2007/0101677 A1 May 10, 2007

Related U.S. Application Data

(60) Provisional application No. 60/729,678, filed on Oct. 24, 2005.

(51) Int. Cl.
*E04F 13/00* (2006.01)
*B44F 7/00* (2006.01)
*E04G 23/00* (2006.01)

(52) U.S. Cl. .................. 52/311.1; 52/311.2; 52/315; 52/741.41; 52/746.12; 52/747.11; 52/747.12

(58) Field of Classification Search ............... 52/311.1, 52/311.2, 315, 741.41, 746.12, 747.11, 747.12, 52/204.59; 33/562, 566
See application file for complete search history.

(56) References Cited

U.S. PATENT DOCUMENTS 2,907,129 A * 10/1959 Bedell ........................ 118/35
3,319,392 A *  5/1967 Fitzgerald .................. 52/389
3,646,715 A *  3/1972 Pope ......................... 52/309.9
4,076,875 A *  2/1978 Van Gasse .................. 428/44
4,205,040 A *  5/1980 Aoyama et al. ............. 264/233
4,270,789 A *  6/1981 Cline ......................... 294/63.2

(Continued)

FOREIGN PATENT DOCUMENTS

JP 73010370 * 7/1967

(Continued)

OTHER PUBLICATIONS

Steam Cleaning Concrete, Dec. 15, 2003, http://www.repair-home.com?Steam_Cleaning_Concrete.html.*

(Continued)

*Primary Examiner*—Richard E Chilcot, Jr.
*Assistant Examiner*—Mark R Wendell
(74) *Attorney, Agent, or Firm*—Stetina Brunda Garred & Brucker (57) ABSTRACT

A mosaic concrete product, methods of creating the same, and methods of fabricating a module for use in creating the mosaic are provided. The methods of installing the mosaic upon an uncured concrete surface utilize the module. The module may be fabricated by mapping out tile in a design corresponding to the mosaic; adhering the tile to a template utilizing an adhesive, the tile being positioned thereon corresponding to the design; and allowing the adhesive to set. The module may define upper and lower surfaces, the upper surface including the tile adhered thereto. The methods of installing the mosaic comprises: positioning the module upon the uncured concrete surface; embedding the tile into the concrete surface; massaging the tile into the concrete surface to interpose a quantity of cement/fines paste between the adjacent tiles; and finishing the concrete surface.

18 Claims, 3 Drawing Sheets

U.S. PATENT DOCUMENTS

| | | | |
|---|---|---|---|
| 4,748,788 A | 6/1988 | Shaw | |
| 4,947,600 A * | 8/1990 | Porter | 52/235 |
| 5,673,489 A * | 10/1997 | Robell | 33/1 B |
| 5,794,401 A | 8/1998 | Shaw | |
| 5,887,399 A | 3/1999 | Shaw | |
| 5,950,394 A | 9/1999 | Shaw | |
| 6,016,635 A | 1/2000 | Shaw | |
| 6,033,146 A | 3/2000 | Shaw | |
| 6,082,074 A | 7/2000 | Shaw | |
| 6,112,487 A | 9/2000 | Shaw | |
| 6,164,037 A * | 12/2000 | Passeno | 52/749.11 |
| 6,330,774 B1 * | 12/2001 | Weinstein | 52/314 |
| 6,785,992 B2 * | 9/2004 | Chiarucci | 40/596 |
| 6,834,438 B1 * | 12/2004 | Heister | 33/566 |
| 6,955,834 B2 * | 10/2005 | Rohrbaugh et al. | 427/180 |
| 7,242,799 B1 * | 7/2007 | Bremsteller | 382/162 |
| 2003/0061722 A1 * | 4/2003 | Bradley | 33/563 |
| 2006/0083591 A1 | 4/2006 | Shaw | |

FOREIGN PATENT DOCUMENTS

WO    WO 8501690    *    4/1985

OTHER PUBLICATIONS

Cement and Concrete Basics, Aug. 22, 2004, http://www.cement.org/basics/concretebasics_placing.asp.*

* cited by examiner

LITHO-MOSAIC

CROSS-REFERENCE TO RELATED APPLICATIONS

This application claims the benefit of U.S. Patent Application Ser. No. 60/729,678, filed 2005 Oct. 24 by the present inventor.

STATEMENT RE: FEDERALLY SPONSORED RESEARCH/DEVELOPMENT

Not Applicable

BACKGROUND

The present invention relates in general to concrete products, and more particularly, to methods for creating a mosaic concrete product, specifically, a method of fabricating a module for use in creating a mosaic upon an uncured concrete surface and a method of installing the mosaic upon the concrete surface utilizing the module.

As is well known in the building and construction trade, concrete is extensively utilized as a building material for industrial, commercial and residential applications. Due to its durability, water resistance, and cost economy, concrete has gained wide spread use in flooring applications. With this widespread use, the public is currently demanding variations in color, surface texture and overall appearance of concrete so that the concrete possesses improved aesthetics similar to more conventional and costly flooring surfaces such as stone, mosaic, and terrazzo.

In order to meet this demand, the concrete trade has developed various coloring and surface finishing techniques to enhance the aesthetics of concrete. Examples of such finishing techniques include salt finish, multiple broom finish, form press finish (e.g. stamped concrete), and exposed aggregate finish.

In addition to the extensive use of concrete in building and construction, the use of mosaics in flooring, walls, and other decorative structures and elements has also become significantly widespread. Such products typically include a picture or decorative design. The design is made by completing several steps. First, with regard to flooring, for example, the flooring surface must be prepared, which may include leveling the surface. Secondly, an adhesive, such as mortar or a tile adhesive, is spread upon the surface. After the adhesive is in place, small individual colored mosaic pieces, such as stone or tile, are set into the surface. Once the adhesive is substantially dried, a grouting product is then set between the mosaic pieces to create a uniform surface and further secure the mosaic pieces to the surface. The resultant product is frequently very beautiful and may be very ornate and detailed. However, due to the extensive amount of time and several additional steps that such a product requires in comparison to other flooring products, mosaic flooring are usually quite expensive. Further, construction of mosaics in walls and other decorative structures and elements may also be quite laborious and expensive.

Although concrete and mosaic products have advanced significantly over recent years to meet the demands of customers and innovative builders, there is no current concrete product for use in flooring, walls, or other decorative structures and elements that makes the creation of mosaics more affordable or efficient than the basic process described above.

Therefore, there exists a need in the art for an improved process of creating mosaic products that is more cost and time efficient. Further, there is a need in the art for a method of producing a mosaic product in conjunction with the preparation of concrete surfaces for use in flooring, walls, or other decorative structures and elements. Finally, there is a need in the art for a method of producing a mosaic product wherein the majority of the art and design work takes place in the studio, where costs and working conditions are controlled, and thereby eliminate much of the time-consuming and labor-intensive aspects of mosaics constructed onsite.

BRIEF SUMMARY

According to embodiments of the present invention, a method of fabricating a module for use in creating a mosaic upon an uncured concrete surface is provided. The method comprises the steps of: (a) mapping out tile in a design corresponding to the mosaic; (b) adhering the tile to a template utilizing an adhesive, the tile being positioned thereon corresponding to the design; and (c) allowing the adhesive to set.

The tile utilized in the mosaic may be selected from various types of mosaic pieces, such as ceramic, glass, stone, shell, and/or brick tile pieces or combinations thereof. The tile defines top and bottom faces. The top surface of the tile will be exposed when the mosaic is completed, with the bottom face being embedded into the concrete surface. Thus, to ensure that the concrete surface is flat, the top face of the tile is preferably flat.

The module may be created utilizing at least one of two different methods disclosed herein. In a first embodiment of the module, the template is preferably fabricated from a porous material, such as a paper or mesh material, which exhibits suitable strength to support the cumulative weight of the tile and durability to withstand both subsequent movement of the module and the installation process. In a second embodiment of the module, the template is preferably fabricated from a mesh material. The method of creating the first embodiment may include the steps of: (a) depositing the adhesive onto the top face of the tile; and (b) placing the tile upon the template with the top face of the tile being in contact therewith, the tile being placed thereon according to a reverse image of the design. Further, the method of creating the second embodiment may include the steps of: (a) depositing the adhesive onto the bottom face of the tile; and (b) placing the tile upon the template with the bottom face of the tile being in contact therewith, the tile being positioned thereon corresponding to the design. In the first embodiment, the tile utilized in the mosaic may be temporarily adhered to the template preferably utilizing a water-soluble adhesive, such as a synthetic resin, Elmers® Glue, or Weldbond Glue. However, in the second embodiment, the mosaic may preferably be permanently adhered to the template such as through the use of Liquid Nails and/or a hot glue gun.

The various embodiments of the method may also include the step of transferring the design onto the template utilizing a marking tool. The design may be sized and configured to indicate the position of the tile on the template for facilitating the assembly of the mosaic. Thus, the marking tool may be a projector, a writing instrument, or the like. The design preferably provides that each tile is preferably spaced at a distance of one-eighth inch or greater from adjacent tile, the distance not being less than one-eighth inches.

In accordance with another aspect of the present invention, a mosaic concrete product and a method of installing a mosaic upon an uncured concrete surface utilizing the above-described module is provided. The module defines upper and lower surfaces. The upper surface includes tile adhered thereto in a design corresponding to the mosaic. As in the first embodiment described above, the method comprises the steps of: (a) positioning the module upon the uncured concrete surface; (b) embedding the tile into the concrete surface for a finish level with the concrete surface; (c) massaging the tile into the concrete surface to interpose a quantity of cement/fines paste between the adjacent tiles; and (d) finishing the concrete surface. The method may further include the steps of: (e) allowing the concrete surface to partially cure and (f) removing the template prior to finishing the concrete surface (for the first embodiment only).

When the template is fabricated from a mesh material, as in the second embodiment, the positioning step includes placing the lower surface of the module into the concrete surface. However, when the template is fabricated from a paper material, as in the first embodiment, the positioning step includes placing the upper surface of the module onto the concrete surface. In the first embodiment, the step of finishing the concrete surface may include applying water to at least a portion of the module to facilitate removal of the template from the tile.

As mentioned above, the tile may be at least one of ceramic, glass, stone, shell, and brick tile pieces or combinations thereof. After the tile has been placed onto the concrete surface, the massaging step may include utilizing a float to massage the tile into the surface. Further, the method preferably includes the steps of: (a) pouring a concrete mixture over a subgrade, the concrete mixture defining the uncured concrete surface; and (b) finishing the uncured concrete surface to dispose the cement/fines paste derived from the concrete mixture at the uncured concrete surface thereof. Such preparation may enhance the massaging of the tile into the surface.

After the tile has been massaged into the concrete surface, the method may further including the steps of: (a) broadcasting a quantity of aggregate upon the concrete surface of the concrete mixture; (b) mixing the aggregate into the cement/fines paste; (c) applying a surface retarder to the concrete surface; and (d) massaging the surface retarder into the concrete surface. Finally, the method may include cleaning the surface with a steam/acid solution after the concrete has cured.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
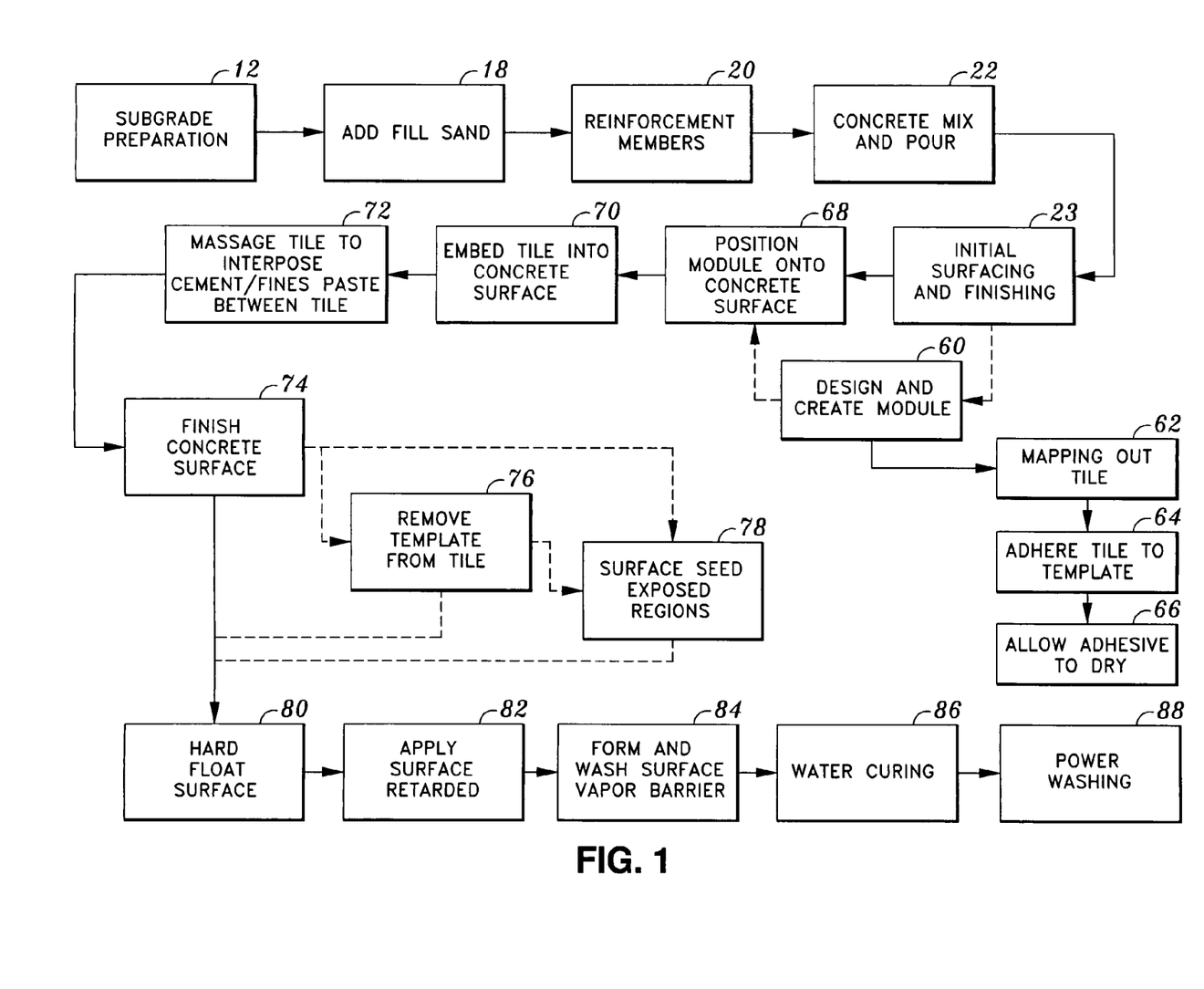
FIG. 1 is a block diagram of a method illustrating various steps which may be performed in installing a mosaic upon an uncured concrete surface utilizing a module in accordance with an aspect of the present invention.
Figure 3A:
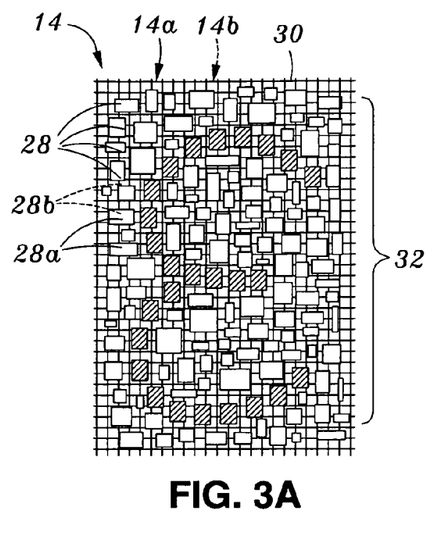
FIG. 3*a* is a perspective view of the module including a template made of a mesh material and tiles being adhered thereto in a design corresponding to the mosaic in accordance with a second embodiment of the present invention.
Figure 3B:
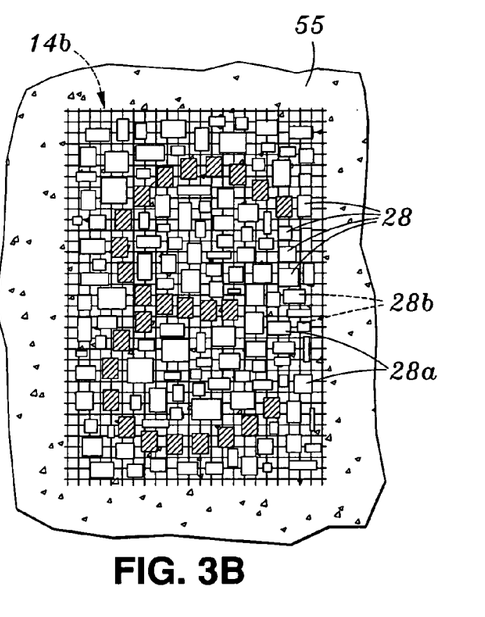
FIG. 3*b* is a perspective view of the module with a lower surface thereof being placed upon the concrete surface for embedding the tiles therein in accordance with the second embodiment of the present invention.
Figure 3C:
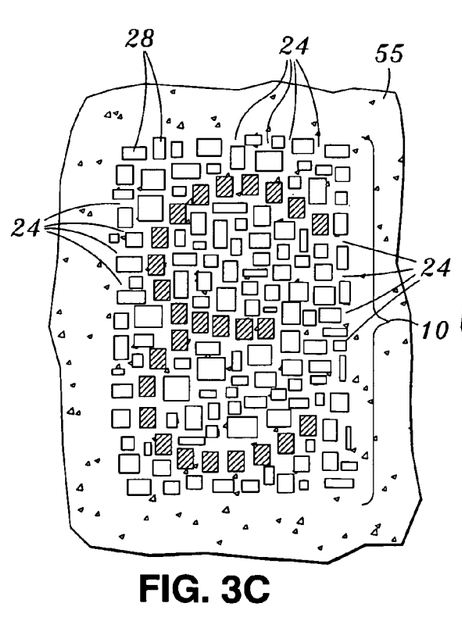
FIG. 3*c* is a perspective view of the tiles being embedded into the concrete surface corresponding to the design of the mosaic in accordance with the second embodiment of the present invention.
Figure 4:
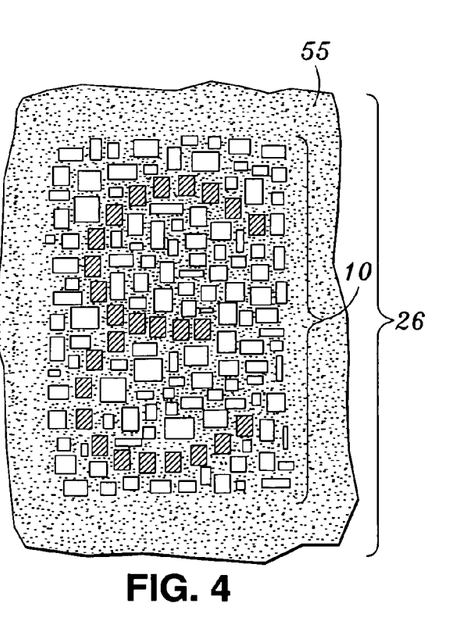
FIG. 4 is a perspective view of the mosaic concrete product with aggregate being surface-seeded therein as created in accordance with an aspect of the present invention.

Referring now to the drawings wherein the showings are for purposes of illustrating a preferred embodiment of the invention only, and not for purposes of limiting the same, FIG. 1 is a block diagram illustrating a method of designing, creating and installing a mosaic 10, as shown in FIG. 4. The teachings herein may be utilized in flooring applications, artistic figures and works, and vertical applications, including walls, in order to facilitate the creation of the mosaic 10. For example, it is contemplated that the methods disclosed herein may be utilized to create the mosaic upon objects such as statues, seating, sculpture, bowls, walls, and flooring applications such as pavers and within molds for walls and foundations, and the like. According to the method illustrated in FIG. 1, the mosaic 10 may be installed upon an uncured concrete surface utilizing a module 14, as shown in FIGS. 2A-2C and 3A-3C. As will be understood by one of skill in the art, the present methods and teaching may be variously modified within the scope of the present invention to facilitate the creation of the mosaic 10 upon the various structures and works mentioned above.

Referring to FIG. 1, an implementation of the present invention may be performed in a flooring application after properly preparing a subgrade at step 12, which may be prepared in a variety of ways, utilizing a variety of tools, materials and methods. One such conventional mode of preparation for flooring applications involves preparing the subgrade to a desired elevation and blade and to compact the subgrade preferably to ninety percent (90%) compaction. Subsequent to this preparation, the subgrade is covered with a layer of clean, moist fill sand at step 18, which is preferably maintained at a minimum four (4) inch layer thickness. Although the fill sand is not absolutely necessary, it is highly desirable to control the hydration process of the concrete. In order to increase the resultant strength of the concrete and to reduce subsequent cracking of the same, at step 20 reinforcement members such as a wire mesh or rebar may be positioned upon the layer of fill sand. The layer, which now includes the fill sand and the reinforcement members, is often collectively referred to as the subgrade.

In flooring applications, a concrete mixture may be formed and poured over the subgrade at step 22 such that the reinforcement members are encapsulated within the concrete mixture. The concrete mixture may be poured to approximately a three and one half (3½) inch to four (4) inch thickness. Although variations in the concrete mixture are contemplated, a preferred concrete mixture comprises seventy percent (70%) sand and thirty percent (30%) ⅜ inch mean diameter aggregate combined with six sack cement (2,000 pounds per square inch) or seven sack cement (2,000 pounds per square inch). Dependent on individual tastes, various color mixtures can be added to the concrete mixture.

After the concrete mixture has been poured at step 22, the concrete mixture is preferably screeded to a desired level plan or grade. The screeding of the concrete mixture results in the same defining a generally level or planar uncured concrete surface. The concrete mixture may not be tamped as is conventional in the art. In some implementations, tamping should be avoided so as not to bring up too much cement/fines paste in the concrete mixture which would be prohibited for subsequent surface seeding of the exposed aggregate thereupon. Rather, subsequent to screeding, the surface of the concrete mixture is surfaced or finished at step 23 to dispose a quantity of the cement/fines paste derived from the concrete mixture to the surface thereof. This finishing may be done utilizing a vibrating bull float, which is typically characterized by possessing an extremely smooth or polished surface which, in addition to bringing up the appropriate amount of cement/fines paste for the subsequent manipulative step, also tends to seal the surface of the concrete mixture. It is contemplated that this initial finishing step may be completed through the use of a vibrating metal bull float, such as a vibrating magnesium bull float or a vibrating aluminum bull float. The preferred metal bull float is sold under the trademark HAL200 by the Lievers Holland Co.

Referring to FIGS. 2A-2C and 3A-3C, a module 14 may be configured to be installed on a concrete surface 55, which is uncured, to facilitate the creation of a mosaic concrete product 26. In fact, it is contemplated that implementations of the present invention may be utilized to create large-scale mosaic patterns, such as in flooring applications. Given the teachings found herein, a person of skill in the art may create limitless types of large-scale prescribed images utilizing mosaic tile 28 that is prearranged and adhered to a template 30. Thus, the mosaic concrete product 26 developed utilizing implementations of the present invention may combine the scale, aesthetics, durability and relatively low cost of concrete paving with the unique and detailed patterns and renderings inherent in mosaics.

Due to the versatility and beauty of this product, implementations of the present invention may revolutionize the scale and scope of which form mosaics can be used in contemporary interior and exterior flooring applications. These applications include, but are not limited to, corporate plazas, street intersections, transit platforms, office buildings, residential areas, beach boardwalks, and city sidewalks. As described herein, implementations of the present invention allow the majority of the art and design work to take place in the studio, where costs and working conditions are controlled, thereby eliminating much of the time-consuming and labor-intensive aspects of mosaics constructed onsite. As mentioned above, it is also contemplated that in addition to flooring applications, embodiments of the present invention may be utilized to create the mosaic on vertical structures such as walls, or on other decorative structures and elements. Therefore, walls, for example, may be constructed in modular fashion utilizing techniques common to flooring applications. For example, a removable form may be created that may support a wall section as it is being created. After setting, the form can later be removed and the wall section can be used. However, it is also contemplated that the mosaic may be placed onto an existing wall. In this regard, the wall may have a suitable cement/fines paste deposited thereon, such as a mortar or other paste. Thus, the wall may be able to receive the mosaic utilizing the teachings found herein. Such methods may likewise be utilized for application on other decorative structures and elements. Such applications may include all of the various forms of fine art, crafts, and the like.

The module 14 may be prepared according to the skill of the creator and the requirements of the project. As a preliminary matter, it may be preferable to design and prepare the module 14 off-site from where the mosaic concrete product 26 will be created. Any design 32 may be chosen for the mosaic depending on taste and preferences of the creator. The design 32 may be a two dimensional design or a series of designs. For example, the design 32 may also be a repeating motif design, as found in fabric, tile, or wallpaper design. The design 32 may also be a singular image as found in fine art; images such as a painting, drawing, photography, or print making. The design 32 may also incorporate geometric or irregular images, and larger compositions may be created utilizing multiple modules 14. The design 32 may be abstract, geometric, figurative, and/or narrative, for example—there is no limitation to the design 32. There is no limit to the overall scale of a project that can be covered utilizing implementations of the present invention, or to the size of the module 14 that can be utilized. The process presented is not limited in its coverage of a given surface—it may cover 1% to 100% of a concrete surface area based on design and budget issues. Indeed, the possibilities and scope with which the present invention may be implemented may be determined by the creativity and ability of the creator. Perhaps the only constraints to implementing the present invention may be considerations for the density of the design 32 and the project cost. Nevertheless, the per-square-foot cost of implementations of the present invention may be considerably less than costs of a traditional mosaic.

Figure 2A:
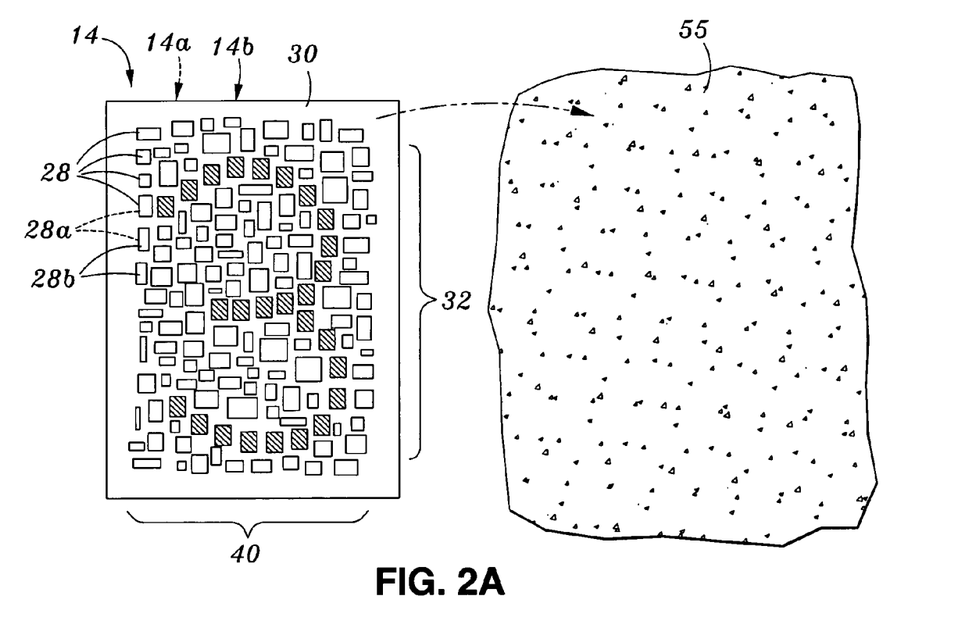
FIG. 2*a* is a perspective view of the module being positionable onto the uncured concrete surface, the module including a template made of a paper material such as paper or mesh and tiles being adhered thereto in a reverse image of a design corresponding to the mosaic in accordance with a first embodiment of the present invention.

Referring to FIGS. 1, 2A and 3A, a method of fabricating the module 14 for use in creating the mosaic upon a concrete surface 55 is provided. The method includes the steps of: mapping out tile 28 in the design 32 corresponding to the mosaic at step 62; adhering the individual tile 28 to the template 30 utilizing an adhesive at step 64, the tile 28 being positioned thereon corresponding to the design 32; and allowing the adhesive to set at step 66. As mentioned above, fabrication of the module 14 is preferably performed by placing the template 30 onto a flat surface.

The step of mapping out the tile in a design 32 corresponding to the mosaic concrete product 26 may be done by arranging the tile 28 as desired. This may be done in "free-form," with no preconceived design, or it may be done according to a given design. In many cases, an individual may only have a general idea of coloring and design types, and may thus need to experiment with placement of the tile 28. While any arrangement of the tile 28 may constitute a design, it is contemplated that the individual may likely prefer to choose/arrange the tile 28 according to a particular design 32. As mentioned, the design 32 may also be transferred onto the template 30 utilizing a marking tool. The template 30 may be fabricated from various materials, as described below. The design 32 may be sized and configured to indicate the position of the tile 28 on the template 30 for facilitating the assembly of the tile 28. The marking tool may be a writing or drawing instrument, or other tools as may be known in the art. It is contemplated that in order to ensure optimal installation of the module 14, each tile 28 should be preferably spaced at a distance of one-eighth to one-fourth inches from adjacent tile 28, the distance not being less than one-eighth inches. Therefore, the design 32 should accordingly reflect such spacing considerations as well as any other considerations that may be pertinent and necessary to ensure effective installation and overall success of the project. The marking tool may be a permanent marker or pencil. If desired, after transferring the design 32 to the template 30, the template 30 may be cut to a preferred size or shape. Further, it is contemplated that the tile 28 may be mapped out according to size and color, which may facilitate the placement of the tile 28 onto the template 30 and ensure the accuracy of the design 32. Indeed, it is contemplated that various steps may be taken to correctly and accurately transfer the design 32 onto the template 30 and thereby ensure that upon adhesion to the template 30, the tile 28 is correctly placed.

After creating the design 32 and mapping out the design 32 onto the template 30, either by utilizing the marking tool such as a permanent marker or by utilizing a projector, the tile 28 may then be adhered to the template 30 at step 64 utilizing the adhesive. The tile 28 may be of any type of mosaic piece, such as ceramic, glass, stone, shell, and/or brick tile pieces, and any other variety of ornamental material or combinations thereof. Of course, when utilized for flooring applications, the mosaic pieces should be durable and wear resistant, especially in high-traffic areas. The tile 28 may be polished or unpolished, cut or uncut, and in short, may be prepared according to the design 32 of the mosaic concrete product 26. However, in a preferred embodiment, the tile 28 is preferably flat on at least the visible face, and be no thicker than one (1) inch and no larger in radius than one (1) square foot. As disclosed in further detail herein, one of the unique advantages associated with a first embodiment of the present invention is that the thickness of the tile 28 may not need to be uniform, and only the visible face of the tile needs to be flat.

Referring to FIG. 2A, in accordance with the first embodiment of the present invention, the tile 28 may define top and bottom faces 28a, 28b, and the method further includes the steps of: depositing the adhesive onto the top face 28a of the tile 28; and placing the tile 28 upon the template 30 with the top face 28a of the tile 28 being in contact therewith at step 64, the tile 28 being placed thereon accordingly with a reverse image 40 of the design 32, as shown in FIG. 2A. In such an embodiment, it is preferred that the template 30 be fabricated from a durable and porous medium, such as a fabric or paper material. The paper material may be any porous material of suitable durability and strength. In particular, the template 30 is preferably of sufficient density such that the design 32 may be readily visible thereon (perhaps from either the side of the template 30). For example, if the template 30 is of a crisscross or woven mesh material, the weave of the mesh should be sufficiently dense to allow the design 32 to be visible thereon, preferably showing all of the necessary detail in the design 32. The template 30 should also be of sufficient porosity such that it may be water permeable. Further, the template 30 may also be water soluble. In addition, the top face 28a of the tile 28 should preferably be flat so as to ensure that upon installation, the concrete surface 55, in which the mosaic 10 is embedded, is also substantially flat. However, in applications where the concrete surface, wall, or decorative structure or elements is not flat, the tile 28 need not be flat. Indeed, the top face 28a of the tile 28 may be selected to create the appropriate look and feel for a given application. Thus, after the design 32 has been mapped onto the template 30, the tiles 28 may be accordingly deposited onto the template 30. Preferably, the temporary adhesive 34 is water soluble. For example, the preferred temporary adhesive 34 is Elmer's Glue®. Nevertheless, other synthetic resins may be suitable that provide sufficient adhesive properties to temporarily maintain the tile 28 adhered to the template 30 during the preparation and installation steps of the module 14, but which allow the template 30 to be removed from the top face 28a of the tile 28 after the tile 28 has been embedded into the uncured concrete surface 55 (in such cases as when the top face 28a of the tile 28 is adhered to the template 30).

Referring now to FIG. 3A, in accordance with a second embodiment of the present invention, the method of fabricating the module 14 may include the steps of: depositing the adhesive 34 onto the bottom face 28b of the tile 28; and placing the tile 28 upon the template 30 with the bottom face 28b of the tile 28 being in contact therewith at step 64, the tile 28 being positioned thereon corresponding to the design 32. In such an embodiment, it is preferred that the template 30 be fabricated of a mesh material. Additionally, the preferred adhesives utilizable with the second embodiment are Liquid Nails and/or Weldbond. Indeed, the template 30 should preferably be fabricated from a mesh material that exhibits suitable strength properties to support the cumulative weight of the tile 28 and to be durable during subsequent movement of the module 14 and installation process. Further, it is preferred that the mesh material utilized for the template 30 allow the proper flow of concrete through it. The preferred mesh is fiberglass mosaic mesh, which is 84% fiberglass and 16% alkaline resistant finish, sized 4×5 mm between yarn centers. An exemplary mosaic fiberglass mesh is available through di Mosaico. See http://www.dimosaico.com/Merchant2/merchant.mv?Screen=CTGY&Store_Code=DM&Category_Code=FM. In addition, it is also preferred that, in order to achieve optimal results in creating a flat surface, that the tile 28 be substantially flat on the top face 28a thereof, as described above. Additionally, because the bottom faces 28b of the tile 28 are to be adhered to the template 30, the bottom faces 38 should preferably also be flat. Moreover, it is contemplated that using tiles 28 of substantially equal and uniform thickness may also ensure that the mosaic 10 is properly created.

In performing the method according to the first embodiment utilizing the template 30 made of the paper material it is preferred that the top face 28a be flat. However, in contrast to prior art methods and to the second embodiment, in which the mesh material is utilized, one of the unique benefits of the first embodiment is that the tile 28 need not be of a substantially equal thickness or have substantially flat bottom surfaces. While such uniformity may facilitate the creation of a flat surface if desired, it is contemplated that other finishing steps may be performed on the mosaic and the concrete surface 55 in order to ensure an overall flatness suitable for high traffic applications and the like. In fact, as described below, because implementations of the present invention utilize the concrete surface 55, such inconsistencies in tile 28 thickness and surface finish may be compensated for by properly floating the surface prior to curing.

The fabrication of the module 14 should preferably be completed to allow sufficient time for the module 14 to dry at step 66 before the module 14 is installed on the uncured concrete surface 55. Preferably, when multiple modules 14 are utilized to create a single mosaic concrete product 26, the modules 14 should be dried and labeled corresponding to their placement in the mosaic. In order to verify the accuracy of the design 32, the modules 14 may be laid out on a flat surface prior to installation. At that time, any changes in the placement of the tile 28 should be made in order to achieve desired results. Additionally, the templates 30 may also be trimmed if necessary. Furthermore, the module 14 should be kept dry and at room temperature prior to installation to preserve the placement and configuration of the tile 28 thereon.

Figure 2B:
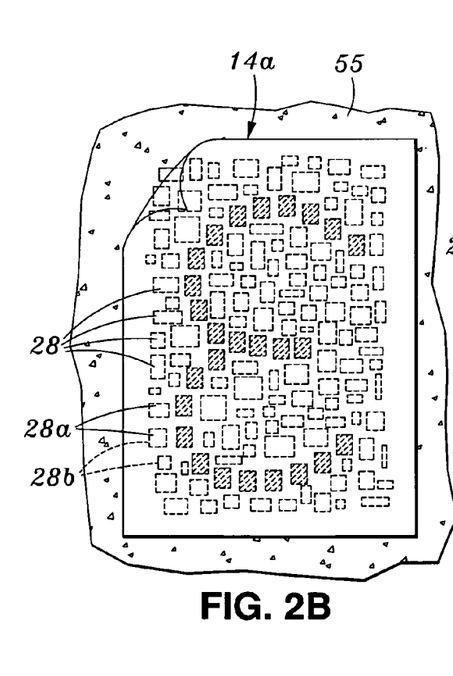
FIG. 2*b* is a perspective view of the module with an upper surface thereof being placed upon the concrete surface for embedding the tiles therein in accordance with the first embodiment of the present invention.

In accordance with an implementation of the present invention, a method of installing the mosaic upon the uncured concrete surface 55 utilizing the module 14 is provided. The module 14 may define upper and lower surfaces 14a, 14b, with the upper surface including tile 28 adhered thereto and the design 32 corresponding to the mosaic. Referring to FIGS. 1, 2B and 3B, the method comprises the steps of: positioning the module 14 upon the concrete surface 55 at step 68; embedding the tile 28 into the concrete surface 55 at step 70; massaging the tile 28 into the concrete surface 55 at step 72 to interpose a quantity of cement/fines paste 24 between the adjacent tiles 28; and finishing the concrete surface 55 at step 74. In the first embodiment, the method may further include allowing the concrete surface 55 to partially cure and removing the template 30 at step 76 prior to finishing.

The positioning step of the method may be variously performed. For example, if the template 30 is fabricated from a mesh material, the positioning step includes placing the lower surface 14b of the module 14 onto the concrete surface 55, as shown in FIG. 3B. In this regard, the bottom face 28b of the tile 28 will be embedded into the concrete surface 55 along with the mesh material. Later, as the tile 28 is massaged into the concrete surface 55, the cement/fines paste 24 may be pushed upwardly between the tiles 28 and mesh material, as illustrated in FIG. 3C. Thus, the cement/fines paste 24 may fill all of the voids between the tiles 28 and eliminate the need for secondary grouting materials, which is another advantageous aspect of implementations of the present invention over the prior art. This advantageous aspect may thus eliminate additional time and material requirements and create a more uniform and durable product.

Figure 2C:
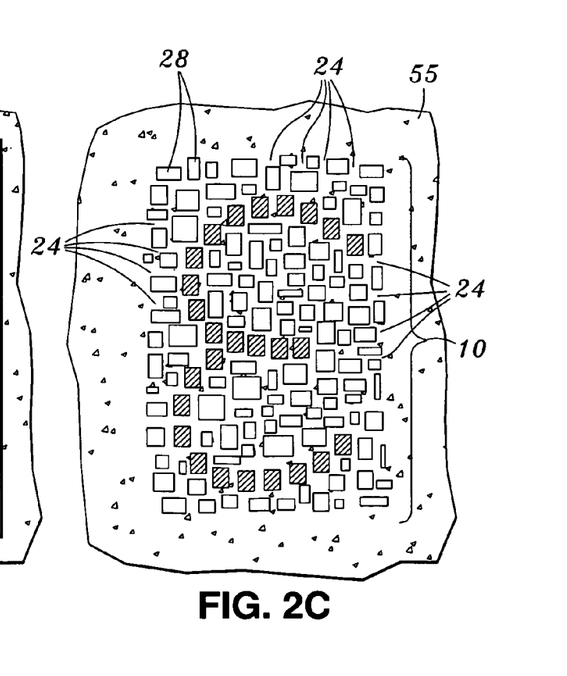
FIG. 2*c* is a perspective view of the tiles being embedded into the concrete surface corresponding to the design of the mosaic in accordance with the first embodiment of the present invention.

The positioning step may be performed differently when implementing aspects of the first embodiment of the present invention wherein the template 30 is fabricated from paper material, as shown in FIGS. 2B and 2C. In such a case, the positioning step may include placing the upper surface 14a of the module 14 onto the concrete surface 55, as shown in FIG. 2B. Thus, the bottom face 28b of the tile 28 may be embedded into the concrete surface 55. However, the template 30, which in this situation is adhered to the top face 28a of the tile 28, will not be embedded into the concrete surface 55, but may likely rest on top of the concrete surface 55, as shown in FIG. 2B.

After the module 14 has been properly positioned upon the concrete surface 55, the massaging step may include massaging the tile into the concrete surface 55 at step 72 utilizing various techniques. According to implementations of the first embodiment, this step is preferably performed before the template 30 has been removed from the tiles 28. However, as indicated above, when the mesh material 44 is utilized, the template 30 will not be removed. As the tile 28 is massaged into the concrete surface 55, the cement/fines paste 24 fills the gaps between adjacent tiles 28, as shown in a final position in FIG. 2C. As described above, this step tends to eliminate the need for secondary grouting materials.

As will be appreciated by one of skill in the art, the tile 28 may be massaged into the concrete surface 55 utilizing tools and/or techniques, some of which are described herein to illustrate exemplary embodiments of the same, including without limitation, wood, fiberglass, or rubber floats. Additionally, the tile 28 may be tapped with a mallet.

The use of a float may tend to ensure that the tiles 28 create a flat surface and that the cement/fines paste 24 has filled all of the voids between adjacent tiles 28. Thus, as also mentioned above, even though the tiles 28 may be of dissimilar thicknesses, a level surface plane for the concrete surface 55 with the embedded tile 28 may be achieved utilizing the float. It should be understood that the float may be one of a variety of tools useful to create a flat, undulating, or irregular concrete surface 55, as desired. Such tools may include the vibrating bull floats, as described above.

After the module 14 has been positioned onto the uncured concrete surface 55 and the tiles 28 are sufficiently embedded therein, the template 30, if adhered to the top face 28a of the tile 28, should be separated from the tile 28 once the concrete surface 55 is substantially set. Care should be taken to not affect the positioning of tiles 28 as designed. Prior to removing the template 30, the concrete surface 55 should preferably be permitted sufficient time to set, although full or partial setting may not occur or be desirable in certain situations. In order to remove the template 30, the method may further include the step of applying water to at least a portion of the module 14 to facilitate removal of the template 30 from the tile 28. Preferably, the template 30 should be lightly soaked with water. Although water is preferred, it is possible that other solvents may be utilized instead of water. However, water is preferred because it does not stain the concrete surface 55. In some situations, wet towels may be placed on top of the template 30 to further aid the process of removal. As discussed above, the adhesive disposed between the top face 28a of the tile 28 and the template 30 may be water-soluble, and the template 30 may be of a porous material. Thus, upon applying the water to the module 14, it is contemplated that the water may penetrate the template 30 and at least partially dissolve the adhesive and/or loosen the bond that the adhesive created between the tile 28 and the template 30.

After sufficient time has passed from application of the water, the template 30 may be removed at step 76 by gently peeling the template 30 from the top face 28a of the tiles 28, as shown in FIG. 2B. This step should be performed with caution; however, if certain tiles 28 remain adhered to the template 30, they may be removed manually and re-embedded in their respective designed locations in the concrete surface 55. In cases where the template 30 is water soluble, the water may preferably dissolve at least a portion of the template 30 and cause the remainder of the template 30 to be released from the tile 28. Thus, the template 30 may be removed from the tile 28 with a brush or water, for example. Utilizing a water soluble template 30 may be advantageous to avoid accidental displacement of the tile 28. Further, this step may be performed even though the cement/fines paste 24 has not filled all of the voids between adjacent tiles 28 because subsequent floating of the surface may tend to ensure that such a result is achieved.

Referring again to FIGS. 1 and 4, after the module 14 has been installed into the concrete surface 55, the concrete surface 55 may be finished utilizing other processes, such as surface seeding exposed aggregate at step 78, such as by brooming, sandblasting, salt or acid bath, troweling, or various other finishing processes, including hard floating the surface at step 80. In preferred implementations of the present invention, the method may further include the steps of broadcasting a quantity of aggregate upon the concrete surface 55 of the concrete mixture; mixing the aggregate into the cement/fines paste; applying a surface retarder to the concrete surface 55; and massaging the surface retarder into the concrete surface. Thus, while the concrete surface 55 is still plastic, small sized aggregate may be broadcast thereupon. The aggregate may include silica sands, coarse sands, brass beads, organic materials, metals, fine sand, composite materials, or combinations thereof. In broadcasting the aggregate onto the surface, it is contemplated that various patterns or visual effects may be created thereby, especially given the flexibility of utilizing several types of aggregate. It is contemplated that certain tools may be utilized to perform the broadcasting steps, such as pneumatic equipment or other spraying/spreading equipment.

Taking care that the aggregate has been swept from the surface of the embedded tile 28 (to ensure proper surface levels), after the aggregate is broadcast upon the concrete surface 55, the aggregate is preferably mixed or worked into the surface, and more particularly, is preferably mixed into the cement/fines paste 24 of the surface located about the periphery and in between the tiles 28. In implementations of the present invention, this step may be utilized to further enhance the physical placement of the aggregate on the surface. This may be accomplished utilizing a power trowel or a float, as described above. However, it is contemplated that the mixing may be accomplished utilizing other devices known in the art. This mixing of the aggregate with the cement/fines paste 24 at the surface is also critical to the process of the present invention because it ensures that the aggregate is fully embedded into the cement/fines paste 24 and thus thoroughly adhered or bonded to the surface of the concrete mixture upon resultant curing.

In alternative embodiments of the present invention, it is contemplated that the concrete surface may also be manipulated utilizing a troweling device, such as a trowel, a stamp, or other suitable tool. Thus, utilizing the troweling device, various designs or patterns may be transferred to the concrete surface utilizing the skill, taste, and design 32 as required by the user. Such manipulation of the concrete surface 55 utilizing the troweling device is performed when the concrete surface 55 has partially set, but prior to full curing. However, numerous other finishing procedures may be performed on the concrete surface 55 after curing. For example, the tile 28 of the mosaic 10 may be sponge cleaned. Additionally, a steam/acid wash of the surface may be performed to properly clean the tile 28 of the mosaic 10. Cleansing the tile 28 may be preferably done prior to other finishing steps, such as utilizing the surface retarder 52, sawcutting, sand or water blasting, grinding, and/or polishing, just to name a few.

At step 82, a surface retarder, such as a chemical surface retarder, may be applied to the surface to uniformly cover the same. The surface retarder slows down the hydration process of the concrete surface 55. The application of the surface retarder at step 82 may be followed by the step of finishing the surface of the concrete mixture 55 with the power trowel, for example, to massage the surface retarder into the cement/fines paste 24 having the aggregate mixed therein. This finishing step preferably results in the penetration of the surface retarder into the cement/fines paste 24 at a distance below the maximum depth of the aggregate, which may be at least approximately ⅜ inch in some instances, and perhaps below the tile 28. Advantageously, this particular finishing step may eliminate hard spots in the resultant concrete by facilitating a full mix of the retarder and the cement/fines paste 24. The power trowel, preferably used in relation to both this and the previously mentioned step, finishes the concrete surface 55 in a generally circular motion. Although various conventional surface retarders may be utilized, one superior surface retarder is designated as SPEC AE manufactured by E.L. Moore Co. of Costa Mesa, Calif.

Referring again to FIG. 1, at step 84, a vapor barrier may be formed on the surface. In the preferred embodiment, the formation of the vapor barrier is facilitated by the application of a liquid chemical evaporation reducer to the concrete surface 55. A preferred evaporation reducer is sold under the trademark CONFILM by the Concrete Tide Co. of Compton, Calif. An alternative vapor barrier may be formed by covering the surface with four (4) or six (6) millimeters of visquene. The vapor barrier is maintained upon the surface of the concrete mixture for a prescribed period of time which may range from approximately two (2) to twenty-four (24) hours.

After the vapor barrier has remained upon the surface for a prescribed period of time, the concrete surface 55 may be washed with water to remove any surface films therefrom. In this washing procedure, it may be preferable to lightly brush the surface with a bristle brush. This may be done in order to enhance or alter the design 32. Please note that using a brass brush may stain the tiles (though it may be cleaned with acid). The washing step, as described herein, may be done without excessive dislodgement and loss of the aggregate and tile 28 due to the full mixture of the retarder and cement/fines paste 24 performed during the power troweling of the surface. Additionally, the application of the liquid evaporation reducer to the concrete surface 55 may also reduce the rate of the evaporation of moisture from the surface and increase the ease at which the excess cement/fines paste 24 and residual surface retarder are washed from the surface.

As illustrated in FIG. 1, subsequent to washing, the concrete surface is cured at step 86. The concrete surface 55 may be cured utilizing water alone, as opposed to chemical curing agents in order to avoid staining of the surface. Such water curing may typically be facilitated through the use of a conventional fogger or soaker hose. After a prescribed period of time (e.g., 30 days after initiating the curing process) any surface residue present on the concrete surface 55 is removed by conventional power washing at step 88 with a ninety percent (90%) steam and ten percent (10%) muriatic acid mixture which is applied by a power washer via a high pressure nozzle.

The resultant surface exhibits a mosaic 10 appearance of various textures and patterns according to the complexity of the design 32. Further, as an extremely flat surface, even if surface seeded exposed aggregate is utilized, it is also suitable for high pedestrian traffic. As described above, various modifications in the color, size, texture, and other characteristics of the aggregate may be modified in order to produce numerous designs.

The above description is given by way of example, and not limitation. Given the above disclosure, one skilled in the art could devise variations that are within the scope of the invention disclosed herein, including various ways of creating different textures, colors, patterns, utilizing various types of mosaic pieces, transferring the design 32 to the module 14, etc. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of fabricating a module for use in creating a mosaic upon an uncured concrete surface, the method comprising:
   a) mapping out tile in a design corresponding to the mosaic, the tile defines top and bottom faces;
   b) depositing an adhesive onto the top face of the tile;
   c) adhering the tile to a template utilizing the adhesive, the tile being placed upon the template with the top face of the tile being in contact therewith, the tile being placed thereon according to a reverse image of the design; and
   e) allowing the adhesive to set.

2. The method of claim 1 wherein the template is fabricated of a porous material such as paper, the template being configured for removal from the tile upon installation of the mosaic into the uncured concrete surface.

3. The method of claim 1 wherein the template is fabricated of a mesh material.

4. The method of claim 1 further including the step of transferring the design onto the template utilizing a marking tool, the design being sized and configured to indicate the position of the tile on the template for facilitating the assembly of the tile.

5. The method of claim 4 wherein the marking tool is a projector.

6. The method of claim 4 wherein the marking tool is a writing instrument.

7. The method of claim 1 wherein the tile is spaced at a distance of at least 1/8 inch or greater from adjacent tile.

8. The method of claim 1 wherein the adhesive is water-soluble.

9. A method of installing a mosaic upon an uncured concrete surface utilizing a module, the module having a template defining upper and lower surfaces, the upper surface including tile adhered thereto in a design corresponding to the mosaic, the upper and lower surfaces being substantially flat planar surfaces, the method comprising:
  a) positioning the module upon the uncured concrete surface;
  b) embedding the tile into the concrete surface for a finish level with the concrete surface;
  c) massaging the tile into the concrete surface to interpose a quantity of cement/fines paste between the adjacent tiles; and
  d) finishing the concrete surface.

10. The method of claim 9 wherein the template is fabricated from a mesh material, and the positioning step includes placing the lower surface of the template onto the concrete surface.

11. The method of claim 9 wherein the template is fabricated from a porous material such as paper or mesh, and the positioning step includes placing the upper surface of the template onto the concrete surface.

12. The method of claim 11 wherein the step of finishing the concrete surface includes applying water to at least a portion of the module to facilitate removal of the template from the tile.

13. The method of claim 9 wherein the tile is one of ceramic, glass, stone, shell, and brick tile pieces.

14. The method of claim 9 wherein the massaging step includes utilizing a float to massage the tile into the surface.

15. The method of claim 9 further including the steps of:
  a) pouring a concrete mixture over a subgrade, the concrete mixture defining the uncured concrete surface; and
  b) finishing the uncured concrete surface using a float to dispose the cement/fines paste derived from the concrete mixture at the uncured concrete surface thereof.

16. The method of claim 9 further including the steps of:
  a) broadcasting a quantity of aggregate upon the concrete surface of the concrete mixture;
  b) mixing the aggregate into the cement/fines paste;
  c) applying a surface retarder to the concrete surface; and
  d) massaging the surface retarder into the concrete surface.

17. The method of claim 9 further including cleaning the surface with a steam/acid solution after the concrete has cured.

18. A mosaic concrete product formed by the method of claim 9.

* * * * *